United States Patent
Choi

(10) Patent No.: US 7,589,815 B2
(45) Date of Patent: Sep. 15, 2009

(54) LIQUID CRYSTAL DISPLAY HAVING OCB MODE LIQUID CRYSTAL LAYER AND METHOD OF MANUFACTURING THE SAME

(75) Inventor: Kyung-Ho Choi, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 335 days.

(21) Appl. No.: 11/330,677

(22) Filed: Jan. 11, 2006

(65) Prior Publication Data

US 2006/0170856 A1 Aug. 3, 2006

(30) Foreign Application Priority Data

Jan. 31, 2005 (KR) .................................. 2005-8790

(51) Int. Cl.
*G02F 1/1333* (2006.01)
*G02F 1/1339* (2006.01)

(52) U.S. Cl. ........................ 349/156; 349/56; 349/84; 349/155; 349/157

(58) Field of Classification Search .................. 349/56, 349/84, 155–157
See application file for complete search history.

(56) References Cited

U.S. PATENT DOCUMENTS 5,385,690 A * 1/1995 Finkelmann et al. ... 252/299.01
6,852,374 B2 * 2/2005 Mizusaki et al. ............. 428/1.2
2003/0117572 A1 * 6/2003 Kanayama et al. .......... 349/155
2003/0214623 A1 * 11/2003 Ebisu et al. .................. 349/156
2005/0068482 A1 * 3/2005 Kume et al. ................. 349/130
2005/0099577 A1 * 5/2005 Lee et al. ..................... 349/155

FOREIGN PATENT DOCUMENTS

JP 9-218411 8/1997

OTHER PUBLICATIONS

Office action dated Mar. 31, 2009, for corresponding Japanese Patent Application No. 2005-182372 listing the cited reference.

* cited by examiner

*Primary Examiner*—Frank G Font
*Assistant Examiner*—Jerry Blevins
(74) *Attorney, Agent, or Firm*—Christie, Parker & Hale LLP

(57) ABSTRACT

There are provided a liquid crystal display having an Optically Compensated Bend (OCB) mode liquid crystal layer and a method of manufacturing the same. The liquid crystal display includes a lower substrate having pixel electrodes. An upper substrate is disposed above the lower substrate. The upper substrate has an opposite surface opposing the lower substrate and a counter electrode disposed on the opposite surface. Polymer spacers having soft polymers are disposed between the lower substrate and the upper substrate. An OCB mode liquid crystal layer is also disposed between the lower substrate and the upper substrate.

20 Claims, 6 Drawing Sheets

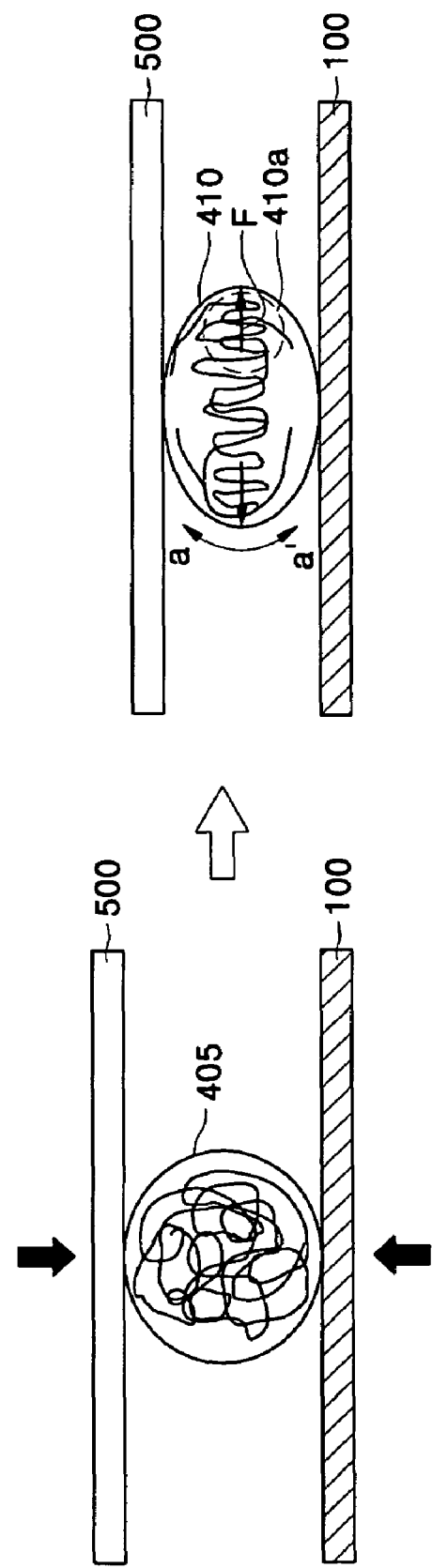

LIQUID CRYSTAL DISPLAY HAVING OCB MODE LIQUID CRYSTAL LAYER AND METHOD OF MANUFACTURING THE SAME

CROSS-REFERENCE TO RELATED APPLICATION

This application claims priority to and the benefit of Korean Patent Application No. 10-2005-008790, filed on Jan. 31, 2005, in the Korean Intellectual Property Office, the entire content of which is incorporated herein by reference.

FIELD OF THE INVENTION

The present invention relates to a liquid crystal display, and more particularly, to a liquid crystal display having an Optically Compensated Bend (OCB) mode liquid crystal layer.

BACKGROUND OF THE INVENTION

Generally in liquid crystal displays, an alignment of liquid crystal molecules located between pixel electrodes and a counter electrode is changed by applying an electric field between the pixel electrodes and the counter electrode. A light transmittance is controlled in accordance with a change in the alignment of the liquid crystal molecules, and images are formed in accordance with the controlled light transmittance. Of the various types of liquid crystal displays, an Optically Compensated Bend (OCB) mode liquid crystal display is known to have a fast response speed and an excellent viewing angle. An OCB mode liquid crystal display includes pixel electrodes, a lower alignment film, a counter electrode, an upper alignment film, and a liquid crystal layer including nematic liquid crystal molecules having a positive dielectric constant anisotropy ($\Delta\epsilon$). The lower alignment film and the upper alignment film are rubbed (and/or coated) in the same direction, and thus the liquid crystal molecules have a splay alignment.

In order to allow the OCB mode liquid crystal display to form an image, a high electric field is first formed between the pixel electrodes and the counter electrode. The high electric field changes the tilt angle of the liquid crystal molecules positioned at the center of the liquid crystal layer to be an angle of 90°, and thus the liquid crystal molecules have a bend alignment. This is referred to as a bend transition. Subsequently, a predetermined voltage is applied between the pixel electrodes and the counter electrode, thereby causing the change in tilt angles of the liquid crystal molecules other than the liquid crystal molecules adjacent to the alignment films and the liquid crystal molecules positioned at the center. As a result, a polarized light passing through the liquid crystal layer is modulated to form an image.

When a liquid crystal display includes a plurality of pixels, most of the liquid crystal molecules disposed in the plurality of pixels should be transited to bend alignment. However, a bend transition of most liquid crystal molecules requires a considerable period of time, and pixels having liquid crystal molecules not being transited to bend alignment may still exist. In order to solve this problem, the predetermined voltage applied for the purpose of the bend transition may be increased, but this can cause increase in power consumption.

SUMMARY OF THE INVENTION

An embodiment of the present invention provides a liquid crystal display capable of causing a sufficient bend transition of liquid crystal molecules without increasing power consumption.

According to one embodiment of the present invention, there is provided a liquid crystal display including: a lower substrate having a pixel electrode; an upper substrate positioned apart from the lower substrate and having an opposite surface opposing the lower surface and a counter electrode disposed on the opposite surface; a polymer spacer disposed between the lower substrate and the upper substrate and having a soft polymer; and an Optically Compensated Bend (OCB) mode liquid crystal layer disposed between the lower substrate and the upper substrate.

According to one embodiment of the present invention, there is provided a liquid crystal display including: a lower substrate having a pixel electrode; an upper substrate disposed apart from the lower substrate and having an opposite surface opposing the lower substrate and a counter electrode disposed on the opposite surface; a polymer spacer disposed between the lower substrate and the upper substrate and including a polymer having a chain arrangement in a vertical axis direction of the polymer spacer and around a horizontal axis direction of the polymer spacer; and an Optically Compensated Bend (OCB) mode liquid crystal layer disposed between the lower substrate and the upper substrate.

According to one embodiment of the present invention, there is provided a method of manufacturing a liquid crystal display, the method including: forming a pixel electrode on a lower substrate; forming a counter electrode on an upper substrate; distributing a polymer spacer including a soft polymer to be between the upper substrate and the lower substrate; bonding the upper substrate and the lower substrate in a manner to allow the counter electrode to face the pixel electrodes; and forming an Optically Compensated Bend (OCB)-mode liquid crystal layer by enclosing liquid crystal molecules between the upper substrate and the lower substrate.

BRIEF DESCRIPTION OF THE DRAWINGS

The accompanying drawings, together with the specification, illustrate exemplary embodiments of the present invention, and, together with the description, serve to explain the principles of the present invention.

FIG. 4 is a schematic diagram illustrating a deformation of a polymer spacer in a liquid crystal display caused by applying a pressure to the polymer spacer according to an embodiment of the present invention.

DETAILED DESCRIPTION

Figure 1:
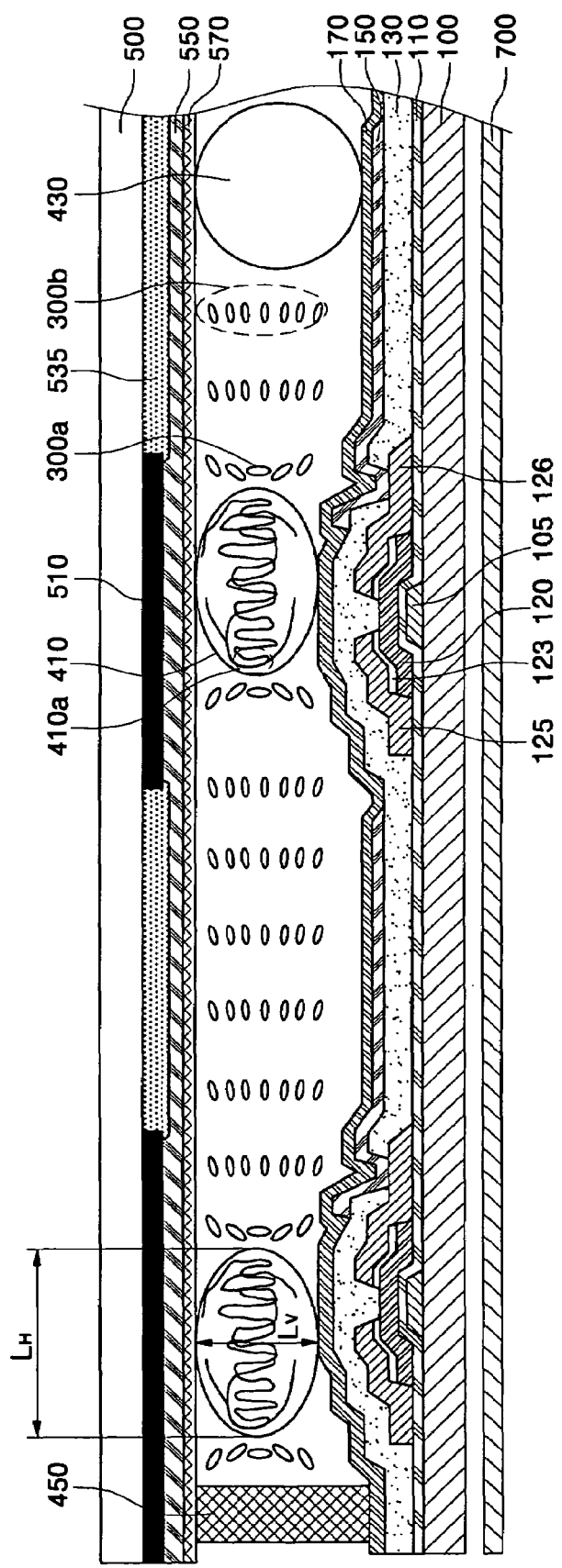
FIG. 1 is a cross-sectional view illustrating a liquid crystal display according to an embodiment of the present invention.

Now, in order to more specifically explain the present invention, exemplary embodiments of the present invention will be described with reference to the accompanying drawings. However, the present invention is not limited to the exemplary embodiments described below, but may be embodied in a variety of forms. In the drawings, if it is mentioned that a layer is positioned on a different layer or a substrate, the layer may be formed directly on the different layer or the substrate, or another layer may be interposed therebetween. Like reference numerals designate like elements.

FIG. 1 is a cross-sectional view illustrating a liquid crystal display according to an embodiment of the present invention. FIG. 1 shows a pixel area of the liquid crystal display.

Referring to FIG. 1, a gate electrode 105 is disposed at each unit pixel area of a lower substrate 100. A gate insulating film 110 is disposed on the whole surface of the lower substrate 100 including the gate electrode 105. A semiconductor layer 120 crossing the gate electrode 105 is disposed on the gate insulating film 110. Ohmic contact layers 123 are disposed on both end portions of the semiconductor layer 120. A source electrode 125 and a drain electrode 126 are disposed on the ohmic contact layers 123, respectively. The gate electrode 105, the semiconductor layer 120, the ohmic contact layers 123, and the source and drain electrodes 125 and 126 constitute a thin film transistor.

An interlayer insulating film 130 covering the thin film transistor and having a via hole for exposing the drain electrode 126 is disposed on the thin film transistor. A pixel electrode 150 connected to the drain electrode 126 exposed in the via hole of the interlayer insulating film 130 is disposed on the interlayer insulating film 130. The pixel electrode 150 may be made of an indium tin oxide (ITO) film and/or an indium zinc oxide (IZO) film. A lower alignment film 170 covering the whole surface of the lower substrate 110 including the pixel electrode 150 is disposed on the pixel electrode 150. The lower alignment film 170 may be made of an inorganic film and/or an organic film. In one embodiment, the lower alignment film 170 is a polyimide film. To have a predetermined tilt angle, the lower alignment film 170 may be subjected in one direction to a parallel alignment process or a tilt alignment process.

An upper substrate 500 having an opposite surface opposing the lower substrate 100 is disposed above the lower substrate 100. A light-shielding pattern 510 is disposed on a part of the upper substrate 500. The light-shielding pattern 510 is positioned to correspond to the thin film transistor, and exposes an area corresponding to the pixel electrode 150. A color filter 535 may be disposed on an area exposed by the light-shielding pattern 510. The color filter 535 may be divided into and disposed as red, green, and blue color filters for each unit pixel area.

A counter electrode 550 covering the light-shielding pattern 510 and the color filter 535 is disposed on the light-shielding pattern 510 and the color filter 535. The counter electrode 550 may be made of an ITO film and/or an IZO film. An upper alignment film 570 is disposed on the counter electrode 550. The upper alignment film 570 may be made of an inorganic film and/or an organic film. In one embodiment, the upper alignment film 570 is a polyimide film. To have a predetermined tilt angle, the upper alignment film 570 may be subjected to a parallel alignment process or a tilt alignment process. In one embodiment, the alignment direction of the upper alignment film 570 is substantially the same as the alignment direction of the lower alignment film 170.

A polymer spacer (or polymer spacers) 410 and an optically compensated bend (OCB)-mode liquid crystal layer are disposed between the lower alignment film 170 and the upper alignment film 570, that is, between the lower substrate 100 and the upper substrate 500. The OCB-mode liquid crystal layer may include nematic liquid crystal molecules having a positive dielectric constant anisotropy ($\Delta\epsilon$).

Polymer chains 410a positioned around a horizontal axis direction of the polymer spacer 410 are arranged in a vertical axis direction. The polymer chains 410a arranged in the vertical axis direction apply anchoring energy to the liquid crystal molecules 300a positioned in the vicinity thereof. As a result, the tilt angle of the liquid crystal molecules 300a becomes close to 90°. However, the liquid crystal molecules 300b spaced apart from the polymer spacers are left in a splay alignment.

In one embodiment, the polymer spacer 410 includes soft polymers. As a result, the shape of the polymer spacer 410 can be easily deformed, and the easy deformation in shape of the polymer spacer 410 allows the polymer chains 410a positioned around the horizontal axis direction of the polymer spacer 410 to be more easily arranged in the vertical axis direction. In one embodiment, the soft polymers are linear polymers.

In one embodiment, the polymer spacer 410 has a length $L_H$ in the horizontal axis direction of the polymer spacer 410 that is greater than a width $L_V$ in the vertical axis direction of the polymer spacer 410 due to a pressure generated in the course of bonding the upper and lower substrates 100 and 500 together. As a result, the polymers of the polymer spacer 410 can be sufficiently stretched around the horizontal axis direction, thereby increasing the ratio of the chains (e.g., the chains 410a) rearranged in the vertical axis direction around the horizontal axis direction of the polymer spacer 410. In addition, to have high surface energy, the linear polymers may include polyalkylene, polyalkylene oxide, polyester, and/or polyacrylate. Accordingly, the linear polymers can have large anchoring energy with respect to the liquid crystal molecules.

In order to further enhance the anchoring energy to the liquid crystal molecules, the polymers of the polymer spacer 410 in one embodiment of the invention include at least one functional group selected from a group consisting of a carbonyl group, a sulfonyl group, an ether group, an ester group, an amide group, a halogen group, and combinations thereof.

In one embodiment, the polymer spacer 410 is uniformly disposed between the lower substrate 100 and the upper substrate 500. As a result, the liquid crystal molecules 300a having a tilt angle close to 90° can also be uniformly disposed between the lower substrate and the upper substrate 500.

Non-deformable spacers 430 may be further provided between the lower substrate 100 and the upper substrate 500. The non-deformable spacers 430 are spacers in which the change in shape, due to the pressure generated in the course of bonding the lower and upper substrates 100 and 500 together, is substantially smaller than that of the polymer spacer 410. Therefore, the gap between the upper substrate 500 and the lower substrate 100 can be kept substantially constant due to the non-deformable spacers 430. The non-deformable spacer 430 may be a hard polymer spacer or a glass spacer.

A backlight 700 is disposed below the lower substrate 100. The backlight 700 may be a backlight for emitting a white light. The liquid crystal display having the aforementioned structure can form a color image using the color filter layer 535.

Alternatively, the backlight 700 may include red (R), green (G), and blue (B) backlights. In this case, the color filter layer 535 may be omitted. Such a liquid crystal display is referred to as a field sequential liquid crystal display (FS-LCD). The FS-LCD displays color images using an afterimage effect of eyes, by time-divisionally and/or sequentially displaying the red, green, or blue light components through the liquid crystal molecules in one unit pixel. The FS-LCD has a fast response speed, and it is thus suitable for displaying moving pictures.

Figure 2:
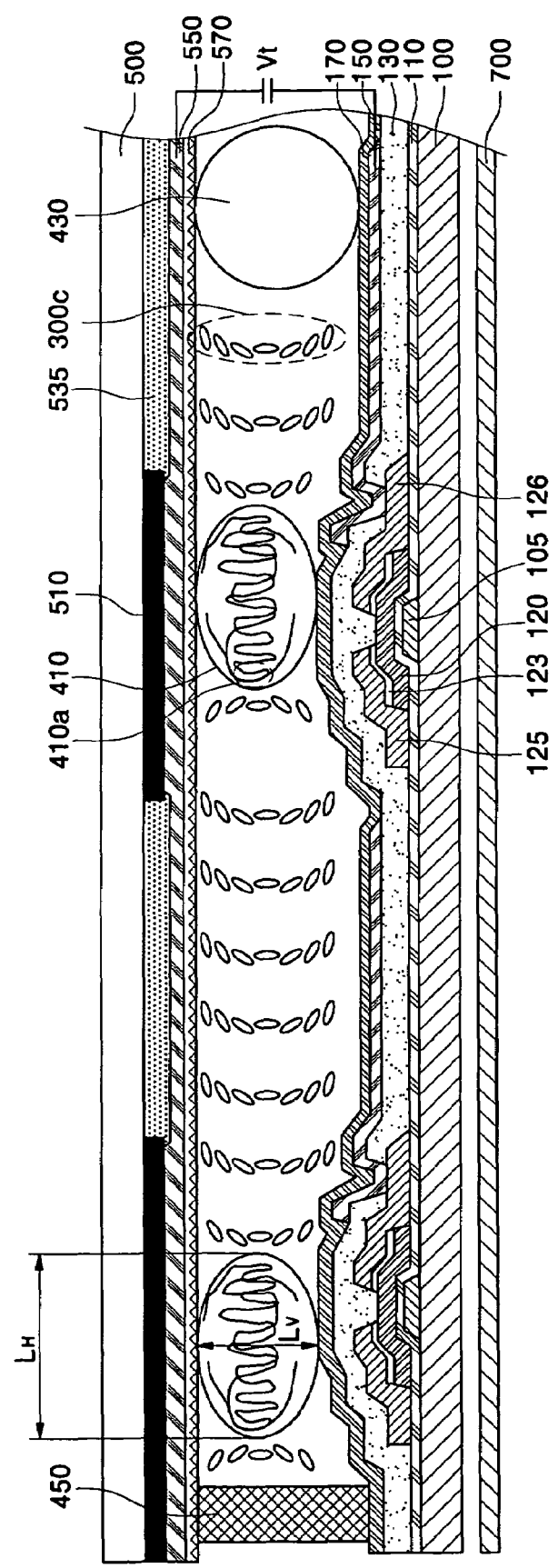
FIG. 2 is a cross-sectional view illustrating a bend transition of the liquid crystal display shown in FIG. 1.

FIG. 2 is a cross-sectional view illustrating a bend transition of the liquid crystal display shown in FIG. 1.

Referring to FIG. 2, a voltage is applied to the counter electrode 550 and another voltage is applied to the pixel electrode 150, so that the counter electrode 550 and the pixel electrode 150 have a predetermined voltage difference Vt therebetween. As a result, the liquid crystal molecules 300c in the OCB-mode liquid crystal layer transition to a bend arrangement. At this time, the liquid crystal molecules (e.g., the liquid crystal molecules 300a in FIG. 1) having a tilt angle close to 90°, which are disposed around the polymer spacer 410, serve as transition seeds. Therefore, the period of time when the bend transition is spread into the whole liquid crystal layer, that is, the transition time, can be reduced and the transition voltage can be also reduced.

Thereafter, the voltage difference between the pixel electrode 150 and the counter electrode 550 is kept higher than the critical voltage (Vcr) for maintaining the bend arrangement. When the voltage difference is increased, the tilt angle of the liquid crystal molecules, other than the liquid crystal molecules adjacent to the alignment films 170 and 570 and the liquid crystal molecules positioned at the center of the liquid crystal layer, is increased. On the other hand, when the voltage difference is decreased, the tilt angle is also decreased. As a result, the polarized light passing through the liquid crystal layer is modulated to form an image. This type of liquid crystal display is referred to as an OCB mode liquid crystal display. In one embodiment, to accomplish an even faster response speed, the OCB mode liquid crystal display is driven by the aforementioned field sequential driving method.

Figure 3A:
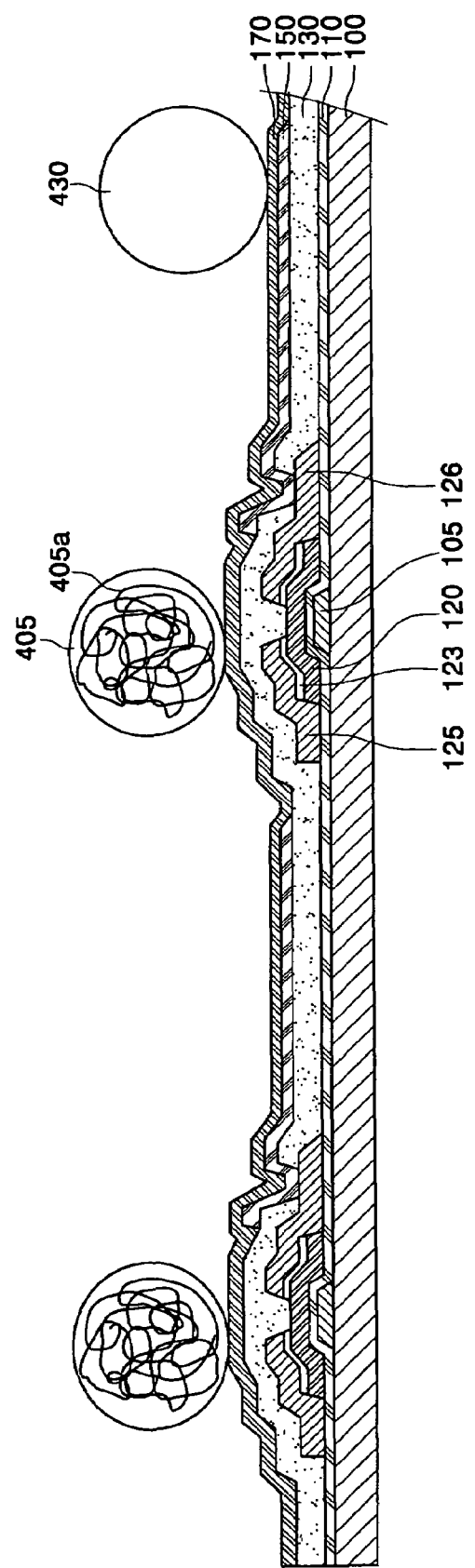
FIGS. 3A, 3B, and 3C are cross-sectional views illustrating a method of manufacturing a liquid crystal display according to an embodiment of the present invention.
Figure 3B:
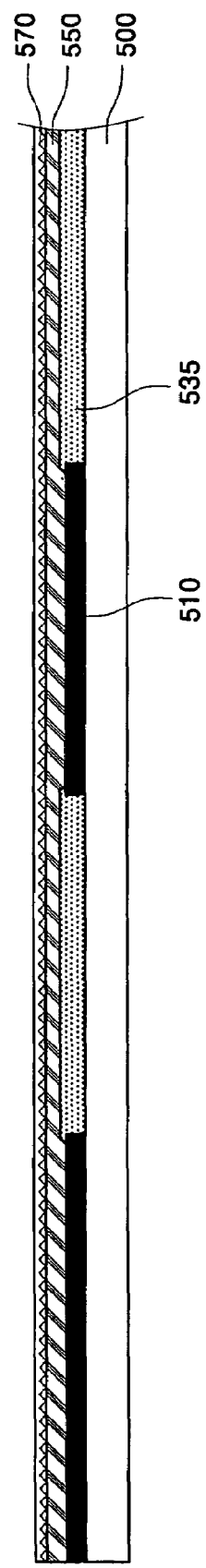
Figure 3C:
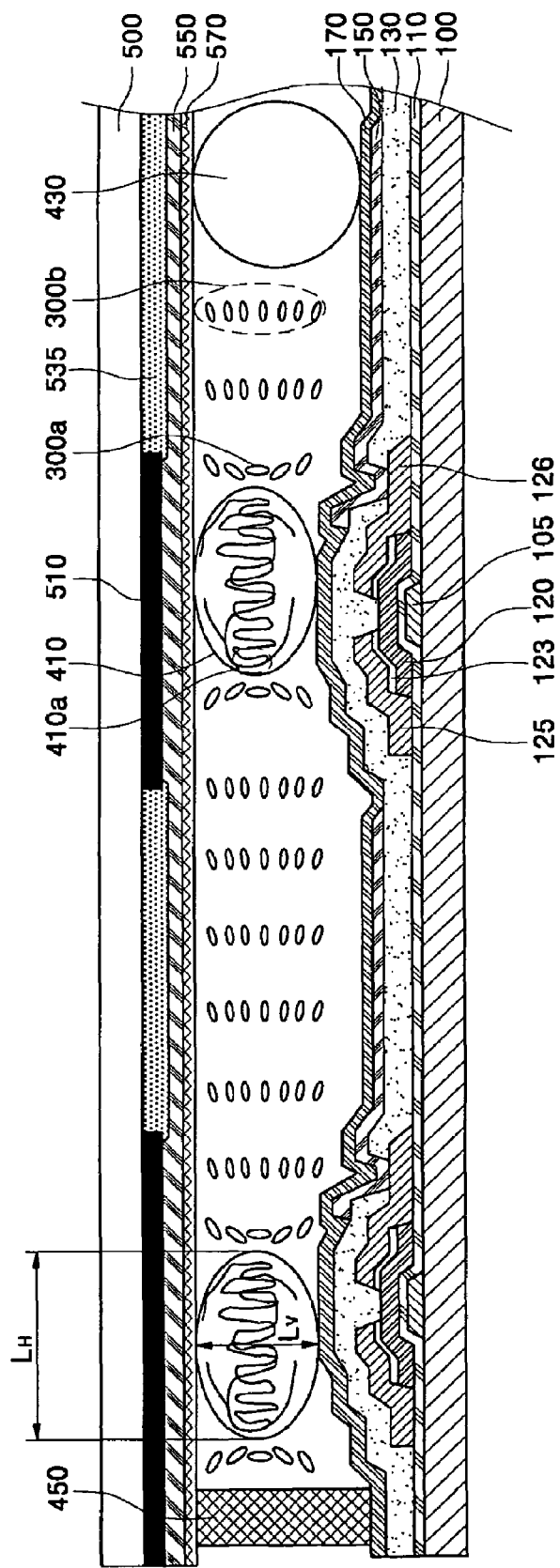

FIGS. 3A, 3B, and 3C are cross-sectional views illustrating a method of manufacturing a liquid crystal display according to an embodiment of the present invention. FIGS. 3A, 3B, and 3C show a pixel area of the liquid crystal display.

Referring to FIG. 3A, by stacking a gate conductive film on the lower substrate 100 and patterning the gate conductive film, the gate electrode 105 is formed. The gate insulating film 110 is formed on the whole surface of the lower substrate 110 including the gate electrode 105. An amorphous silicon layer and an impurity-amorphous silicon layer are sequentially formed on the gate insulating film 110. The ohmic contact layers 123 are formed by patterning the impurity-amorphous silicon layer, and the semiconductor layer 120 is formed by patterning the amorphous silicon layer. By stacking a source/drain conductive film on the ohmic contact layers 123 and patterning the source/drain conductive film, the source electrode 125 and the drain electrode 126 are formed. The gate electrode 105, the semiconductor layer 120, the ohmic contact layers 123, and the source and drain electrodes 125 and 126 constitute the thin film transistor.

The interlayer insulating film 130 covering the thin film transistor is formed on the thin film transistor. The via hole is formed in the interlayer insulating film 130 to expose the drain electrode 126. Subsequently, by forming a pixel conductive film on the interlayer insulating film 130 and pattering the pixel conductive film, the pixel electrode 150 connected to the drain electrode 126 exposed in the via hole of the interlayer insulating film 130 is formed. The pixel conductive film may be made of an ITO film and/or an IZO film.

Subsequently, the lower alignment film 170 is formed on the whole surface of the lower substrate 110 including the pixel electrode 150. The lower alignment film 170 may be made of an organic film and/or an inorganic film. In one embodiment, the alignment film 170 is a polyimide film. Subsequently, the lower alignment film 170 is subjected in one direction to a parallel or horizontal alignment process or a tilt alignment process. The alignment process can be carried out using a rubbing method or an optical alignment method.

A polymer spacer 405 having a certain softness is distributed on the lower substrate 100 having the lower alignment film 170. Non-deformable spacers 430 can be further distributed before or after distributing the polymer spacer 405. The polymer spacer 405 includes polymer chains 405a. In FIG. 3A, the polymer chains 405a have a disordered arrangement.

In one embodiment, the polymer spacer 405 having the certain softness includes linear polymers. Moreover, to have high surface energy, the linear polymers may include polyalkylene, polyalkylene oxide, polyester, and/or polyacrylate. Also, the polymer spacer 405 has the certain softness may have at least one functional group selected from a group consisting of a carbonyl group, a sulfonyl group, an ether group, an ester group, an amide group, a halogen group and combinations thereof.

Referring to FIG. 3B, the upper substrate 500 is prepared, and the light-shielding pattern 510 is formed on the upper substrate 500. The light-shielding pattern 510 is formed in the areas corresponding to (or to cover) the area of the lower substrate (e.g., the lower substrate 100 in FIG. 3A) where the thin film transistor is formed, and the other areas of the lower substrate are exposed (or not covered by the light-shielding pattern 510).

The color filter layer 535 is formed on the areas exposed by the light-shielding pattern 510. The counter electrode 550 covering the light-shielding pattern 510 and the color filter layer 535 is formed on the light-shielding pattern 510 and the color filter layer 535. The upper alignment film 570 is formed on the counter electrode 550, and, in one embodiment, the upper alignment film 570 is subjected to an alignment process and has an alignment direction that is substantially the same as the alignment direction of the lower alignment film 170. Here, the material and the alignment process for the upper alignment film 570 are substantially the same as the material and the alignment process described for the lower alignment film 170 and will not be described again.

Referring to FIG. 3C, a sealant 450 is coated on the outer circumference of the upper substrate 500, and the lower substrate 100 and the upper substrate 500 are bonded to each other using the sealant 450. At this time, a predetermined pressure is applied to the upper substrate 500 and the lower substrate 100, respectively. Accordingly, the polymer spacer (e.g., the polymer spacer 405 of FIG. 3A) is transformed into a polymer spacer 410 due to the pressure. The polymer spacer 410 has polymer chains 410a arranged in the vertical axis direction around the horizontal axis direction of the polymer spacer 410. Subsequently, by enclosing the liquid crystal molecules between the lower substrate 100 and the upper substrate 500, the OCB-mode liquid crystal layer 300 is formed.

FIG. 4 is a schematic diagram illustrating a deformation of a polymer spacer in a liquid crystal display caused by applying a pressure to the polymer spacer according to an embodiment of the present invention.

Referring to FIG. 4, when a predetermined pressure is applied to the upper substrate 500 and the lower substrate 100, the greatest force F is applied to the central portion of the polymer spacer 405. Therefore, the largest stretching force is applied to the polymers positioned around the horizontal axis direction of the polymer spacer 405 in the a-a' direction. Accordingly, the polymer chains in this portion receive the largest stretching force, thereby a rearrangement of the polymer chains to the vertical axis direction is maximized. As a result, the polymer spacer 405 transformed into the polymer spacer 410 has the rearranged polymer chains 410a arranged in the vertical axis direction around the horizontal axis direction of the polymer spacer 410.

As described above, in an OCB mode liquid crystal display according to the present invention, it is possible to further reduce a bend transition time and to cause a sufficient bend transition of liquid crystal molecules.

While the present invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A liquid crystal display comprising:
   a lower substrate having a pixel electrode;
   an upper substrate positioned apart from the lower substrate and having an opposite surface facing the lower substrate and a counter electrode disposed on the opposite surface;
   a polymer spacer disposed between the lower substrate and the upper substrate and comprising a soft polymer; and
   an Optically Compensated Bend (OCB) mode liquid crystal layer disposed between the lower substrate and the upper substrate,
   wherein the polymer spacer has a length in a horizontal axis direction extending parallel to the opposite surface and a width in a vertical axis direction extending perpendicular to the opposite surface, and wherein the length is greater than the width, and
   wherein the polymer spacer comprises a plurality of polymer chains, and wherein the polymer spacer is configured to increase a ratio of the polymer chains in the vertical axis direction to apply an anchoring energy to tilt liquid crystal molecules of the OCB mode liquid crystal layer disposed around the polymer spacer to substantially have a tilt angle of 90°.

2. The liquid crystal display according to claim 1, wherein the polymer spacer is an ellipsoidal polymer spacer.

3. The liquid crystal display according to claim 1, wherein the soft polymer comprises a linear polymer.

4. The liquid crystal display according to claim 3, wherein the linear polymer comprises a polymer material selected from a group consisting of polyalkylene, polyalkylene oxide, polyester, polyacrylate, and combinations thereof.

5. The liquid crystal display according to claim 3, wherein the linear polymer comprises a functional group selected from a group consisting of a carbonyl group, a sulfonyl group, an ether group, an ester group, an amide group, a halogen group, and combinations thereof.

6. The liquid crystal display according to claim 1, further comprising another polymer spacer selected from a group consisting of a hard polymer spacer and a glass spacer, and disposed between the lower substrate and the upper substrate.

7. The liquid crystal display according to claim 1, further comprising a lower alignment film disposed on the pixel electrode and an upper alignment film disposed on the counter electrode,
   wherein the lower alignment film and the upper alignment film are aligned substantially in a same direction.

8. The liquid crystal display according to claim 1, wherein the OCB mode liquid crystal layer includes nematic liquid crystal molecules having a positive dielectric constant ansotropy.

9. A liquid crystal display comprising:
   a lower substrate having a pixel electrode;
   an upper substrate disposed apart from the lower substrate and having an opposite surface facing the lower substrate and a counter electrode disposed on the opposite surface;
   a polymer spacer disposed between the lower substrate and the upper substrate and including a polymer comprising a plurality of polymer chains; and
   an Optically Compensated Bend (OCB) mode liquid crystal layer disposed between the lower substrate and the upper substrate,
   wherein the polymer spacer is configured to increase a ratio of the polymer chains extending in a vertical axis direction perpendicular to the opposite surface to apply an anchoring energy to tilt liquid crystal molecules of the OCB mode liquid crystal layer to substantially have a tilt angle of 90°.

10. The liquid crystal display according to claim 9, wherein the polymer spacer has a length in a horizontal axis direction extending parallel to the opposite surface and a width in the vertical axis direction extending perpendicular to the opposite surface, and wherein the length is greater than the width.

11. The liquid crystal display according to claim 9, wherein the polymer is a linear polymer.

12. The liquid crystal display according to claim 11, wherein the linear polymer comprises a polymer material selected from a group consisting of polyalkylene, polyalkylene oxide, polyester, polyacrylate, and combinations thereof.

13. The liquid crystal display according to claim 11, wherein the linear polymer comprises a functional group selected from a group consisting of a carbonyl group, a sulfonyl group, an ether group, an ester group, an amide group, a halogen group, and combination thereof.

14. The liquid crystal display according to claim 9, wherein the polymer is a soft polymer.

15. A method of manufacturing a liquid crystal display, the method comprising:
   forming a pixel electrode on a lower substrate;
   forming a counter electrode on an upper substrate having an opposite surface facing the lower substrate;
   distributing a polymer spacer including a soft polymer comprising a plurality of polymer chains to be between the upper substrate and the lower substrate;
   bonding the upper substrate and the lower substrate in a manner to allow the counter electrode to face the pixel electrode;
   configuring the polymer spacer to increase a ratio of the polymer chains extending in a vertical axis direction perpendicular to the opposite surface to apply an anchoring energy to tilt liquid crystal molecules of an Optically Compensated Bend (OCB) mode liquid crystal layer to substantially have a tilt angle of 90; and
   forming the Optically Compensated Bend (OCB) mode liquid crystal layer by enclosing the liquid crystal molecules between the upper substrate and the lower substrate.

16. The method according to claim 15, wherein the soft polymer is a linear polymer.

17. The method according to claim 16, wherein the linear polymer comprises a polymer material selected from a group consisting of polyalkylene, polyalkylene oxide, polyester, polyacrylate, and combinations thereof.

18. The method according to claim 16, wherein the linear polymer comprises a functional group selected from a group consisting of a carbonyl group, a sulfonyl group, an ether group, an ester group, an amide group, a halogen group, and combinations thereof.

19. The method according to claim 15, wherein another polymer spacer selected from a group consisting of a hard polymer spacer and a glass spacer is further distributed between the lower substrate and the upper substrate.

20. The method according to claim 15, further comprising configuring the polymer spacer to have a length in a horizontal axis direction extending parallel to the opposite surface and a width in the vertical direction axis direction extending perpendicular to the opposite surface, wherein the length is configured to be greater than the width.

* * * * *

UNITED STATES PATENT AND TRADEMARK OFFICE
CERTIFICATE OF CORRECTION

PATENT NO. : 7,589,815 B2  
APPLICATION NO. : 11/330677  
DATED : September 15, 2009  
INVENTOR(S) : Kyung-Ho Choi et al.

Page 1 of 1

It is certified that error appears in the above-identified patent and that said Letters Patent is hereby corrected as shown below:

On the Title Page:

(57) Abstract, line 1          Delete "are"  
                               Insert -- is --

Column 7, Claim 8, lines 53-54  Delete "ansotropy"  
                               Insert -- anisotropy. --

Column 8, Claim 15, line 40    Delete "90;"  
                               Insert -- 90°; --

Signed and Sealed this  
Twentieth Day of December, 2011

David J. Kappos  
*Director of the United States Patent and Trademark Office*